United States Patent
Wu et al.

(10) Patent No.: US 11,427,198 B2
(45) Date of Patent: Aug. 30, 2022

(54) DEVICE AND METHOD FOR CONTROLLING TRAVEL OF VEHICLE, AND PROCESSOR-READABLE STORAGE MEDIUM

(71) Applicant: BOE TECHNOLOGY GROUP CO., LTD, Beijing (CN)

(72) Inventors: Ying Wu, Beijing (CN); Xiangdong Yang, Beijing (CN); Xun Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 603 days.

(21) Appl. No.: 16/330,861

(22) PCT Filed: Sep. 6, 2018

(86) PCT No.: PCT/CN2018/104299
§ 371 (c)(1),
(2) Date: Mar. 6, 2019

(87) PCT Pub. No.: WO2019/109691
PCT Pub. Date: Jun. 13, 2019

(65) Prior Publication Data
US 2021/0331676 A1 Oct. 28, 2021

(30) Foreign Application Priority Data
Dec. 4, 2017 (CN) .......................... 201711262404.8

(51) Int. Cl.
*B60W 30/16* (2020.01)
*B60W 40/105* (2012.01)
(Continued)

(52) U.S. Cl.
CPC ........ *B60W 30/162* (2013.01); *B60W 40/105* (2013.01); *B60W 50/00* (2013.01);
(Continued)

(58) Field of Classification Search
CPC ............... B60W 30/162; B60W 50/00; B60W 2554/80; B60W 2050/0083;
(Continued)

(56) References Cited

U.S. PATENT DOCUMENTS 8,712,663 B1    4/2014  Zeng
9,052,713 B2 *  6/2015  Schulz ..................... G05D 1/00
(Continued)

FOREIGN PATENT DOCUMENTS

CA         2860892 A1 *  5/2013  ................ B60T 7/22
CN      101282864 A      10/2008
(Continued)

OTHER PUBLICATIONS

Machine Translation: JP-2005339241-A (year:2005).*
(Continued)

*Primary Examiner* — Anne Marie Antonucci
*Assistant Examiner* — Connor L Knight
(74) *Attorney, Agent, or Firm* — Dilworth & Barrese, LLP.; Michael J. Musella, Esq.

(57) ABSTRACT

A device, method, and processor readable storage medium for controlling travel of a vehicle. The device includes a processor and a controller; the processor is configured to set a speed curve of the vehicle according to a relative speed and distance between the vehicle and the front subject, and the controller is configured to control the vehicle to travel according to the set speed curve.

14 Claims, 3 Drawing Sheets

(51) Int. Cl.
  *B60W 50/00* (2006.01)
  *G06F 17/11* (2006.01)
(52) U.S. Cl.
  CPC ..... *G06F 17/11* (2013.01); *B60W 2050/0013* (2013.01); *B60W 2050/0083* (2013.01); *B60W 2554/80* (2020.02)
(58) Field of Classification Search
  CPC ....... B60W 2050/0013; B60W 40/105; B60W 30/16; B60W 30/143; B60W 2554/804; G06F 17/11
  See application file for complete search history.

(56) References Cited

U.S. PATENT DOCUMENTS

| | | | |
|---|---|---|---|
| 2008/0269998 A1 | 10/2008 | Shiiba et al. | |
| 2010/0198478 A1* | 8/2010 | Shin | B60W 10/06 701/96 |
| 2013/0158830 A1 | 6/2013 | Kurumisawa et al. | |
| 2013/0345944 A1* | 12/2013 | Kasiraj | B60W 30/162 701/96 |
| 2014/0172217 A1 | 6/2014 | Miyazaki et al. | |
| 2016/0288788 A1 | 10/2016 | Nagasaka et al. | |
| 2017/0259822 A1* | 9/2017 | Schubert | B60W 10/18 |
| 2018/0001764 A1* | 1/2018 | Bang | B60W 30/16 |
| 2018/0057002 A1* | 3/2018 | Lee | B60W 50/14 |

FOREIGN PATENT DOCUMENTS

| | | | | |
|---|---|---|---|---|
| CN | 103523016 A | | 1/2014 | |
| CN | 103748379 A | | 4/2014 | |
| CN | 104960522 A | | 10/2015 | |
| CN | 105857309 A | | 8/2016 | |
| CN | 105946765 A | | 9/2016 | |
| CN | 106347351 A | | 1/2017 | |
| CN | 106564484 A | | 4/2017 | |
| CN | 106828493 A | * | 6/2017 | ............ B60W 30/14 |
| CN | 106828493 A | | 6/2017 | |
| CN | 107016193 A | | 8/2017 | |
| CN | 107117170 A | | 9/2017 | |
| CN | 106608261 B | * | 4/2021 | ............ B60W 30/16 |
| DE | 102011086858 A | | 5/2013 | |
| JP | H1120503 A | | 1/1999 | |
| JP | 2005339241 A | * | 12/2005 | ........ B60W 50/0097 |
| WO | WO-2017221233 A1 | * | 12/2017 | ............ B60W 30/14 |

OTHER PUBLICATIONS

International Search Report and Written Opinion dated Nov. 14, 2018 from State Intellectual Property Office of the P.R. China.
First Chinese Office Action from Chinese Patent Application No. 201711262404.8 dated Mar. 20, 2020.
Extended European Search Report from European Patent Application No. 18849417.3 dated Oct. 25, 2021.

* cited by examiner

DEVICE AND METHOD FOR CONTROLLING TRAVEL OF VEHICLE, AND PROCESSOR-READABLE STORAGE MEDIUM

This application claims the priority of Chinese Patent Application No. 201711262404.8, filed on Dec. 4, 2017, which is hereby incorporated by reference in its entirety as a part of this application.

TECHNICAL FIELD

The present disclosure relates to a device and method for controlling travel of vehicle, and a processor-readable storage medium, and more particularly to a device and method for controlling travel speed of vehicle, and a processor-readable storage medium.

BACKGROUND

At the time of travelling, it is vital important for a vehicle to maintain a necessary safety distance relative to the vehicle and pedestrian in front. Currently, in order to maintain a safety distance for travel, when the distance relative to the vehicle or pedestrian in front is below a certain threshold, the driver will accordingly take brake to decelerate the vehicle. However, this manner depends on the driver's judgment and experience, sometimes the driver approaches heavily step on the brake pedal in order to avoid rear-end crash or collision when finding that the distance relative to the vehicle or pedestrian in front is too small, resulting in sudden braking. This situation usually causes serious wearing of the brake system and the occupant in the vehicle to feel uncomfortable.

SUMMARY

According to an aspect of the present disclosure, there is provided a device for controlling travel of a vehicle, comprising a processor and a controller, wherein the processor configured to set a speed curve of the vehicle based on relative speed and distance of the vehicle with respect to a front subject; and the controller is configured to control the vehicle to travel according to a set speed curve.

In an embodiment, the processor is configured to establish an optimization function about speed based on the relative speed and distance of the vehicle with respect to the front subject, and solve the optimization function, such that the relative speed of the vehicle with respect to the front subject is close to zero when the vehicle is traveling at a speed corresponding to a solution obtained by solving the optimization function.

In an embodiment, the processor is configured to judge whether the optimization function has a solution when solving the optimization function, and if there is a solution, output an optimized curve about speed as the set speed curve.

Exemplarily, the distance between the vehicle and the front subject is kept as large as possible when the vehicle travels at the set speed curve. In this case, the safety distance between the host vehicle and the front subject can be ensured to the greatest extent, the braking force during deceleration can be reduced, and thereby the braking consumption and the wearing of the braking system are lowered.

Exemplarily, the distance between the vehicle and the front subject is kept as small as possible when the vehicle travels at the set speed curve. In this case, the following performance of the host vehicle and the preceding vehicle can be ensured to the greatest extent, and thus the distance between vehicles is reduced and the roadway utilization is improved.

According to another aspect of the present disclosure, there is provided a method for controlling travel of a vehicle, comprising: setting a speed curve of the vehicle according to relative speed and distance of the vehicle with respect to a front subject; and controlling the vehicle to travel according to a set speed curve.

BRIEF DESCRIPTION OF THE DRAWINGS

In order to more clearly illustrate the technical solutions in the embodiments of the present disclosure, drawings necessary for describing the embodiments or the prior art will be briefly introduced below, obviously, the described drawings are only related to some embodiments of the present disclosure and thus are not limitative of the present disclosure.

DETAILED DESCRIPTION OF THE EMBODIMENTS

Figure 1:
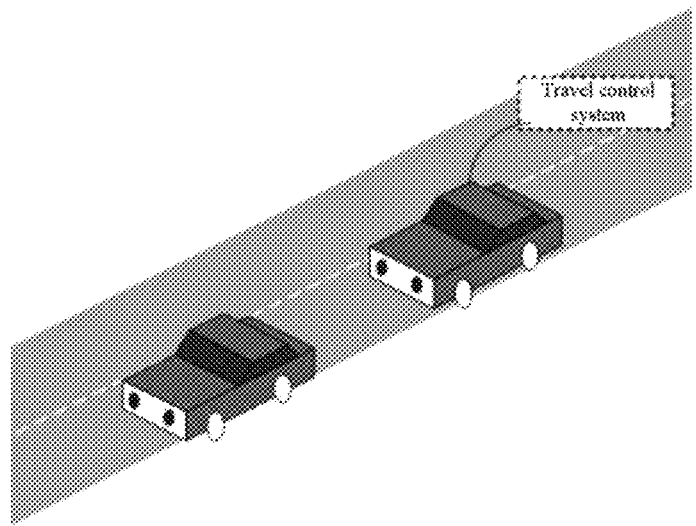
FIG. 1 is a schematic diagram of a vehicle equipped with a travel control system according to an embodiment of the present disclosure.

Hereinafter, the technical solutions in the embodiments of the present disclosure will be described clearly and completely with reference to the accompanying drawings, example embodiments and their various features and advantageous details will be more fully described with reference to the non-limiting example embodiments illustrated in the accompanying drawings and detailed in the following description. It should be noted that the features illustrated in the drawings are not necessarily drawn to scale. Description of known materials, components, and manufacturing techniques is omitted in the present disclosure so as not to obscure the example embodiments of the present disclosure. The examples are given only to facilitate understanding implementation of the example embodiments of the present disclosure, and further enabling those skilled in the art to practice the example embodiments. Therefore, the examples are not to be construed as limiting the scope of the embodiments of the present disclosure.

The vehicle control device according to an embodiment of the present disclosure will be described below with reference to the drawings. For convenience of description, hereinafter, a host vehicle refers to a vehicle on which the control device according to an embodiment of the present disclosure is mounted, and a preceding vehicle refers to a vehicle that is traveling in front of the host vehicle. The host vehicle can obtain driving information of the preceding vehicle by a sensor installed on the host vehicle, or can obtain driving information of the preceding vehicle based on vehicle-to-vehicle communication (V2V) between the host vehicle and the preceding vehicle, for example, vehicle-to-vehicle communication is performed through DSRC (Dedicated Short-Range Communication) to obtain information such as speed and acceleration of the preceding vehicle. For example, protocols such as Bluetooth, ZigBee, GSM, and 802.11 can be used to implement vehicle-to-vehicle communication.

FIG. 1 illustrates a schematic diagram of a scenario in which a vehicle is traveling on road. As illustrated in FIG. 1, one vehicle follows another vehicle. To facilitate illustrating the principles of the present disclosure, the following description is provided with the following vehicle equipped with a vehicle travel control system according to an embodiment of the present disclosure as the host vehicle. As mentioned above, in order to maintain a safety distance between the host vehicle and the preceding vehicle, it is necessary to set the driving speed curve of the host vehicle according to relative speed and distance between the host vehicle and the preceding vehicle in real time, and thereby control the travel speed of the host vehicle.

Figure 2:
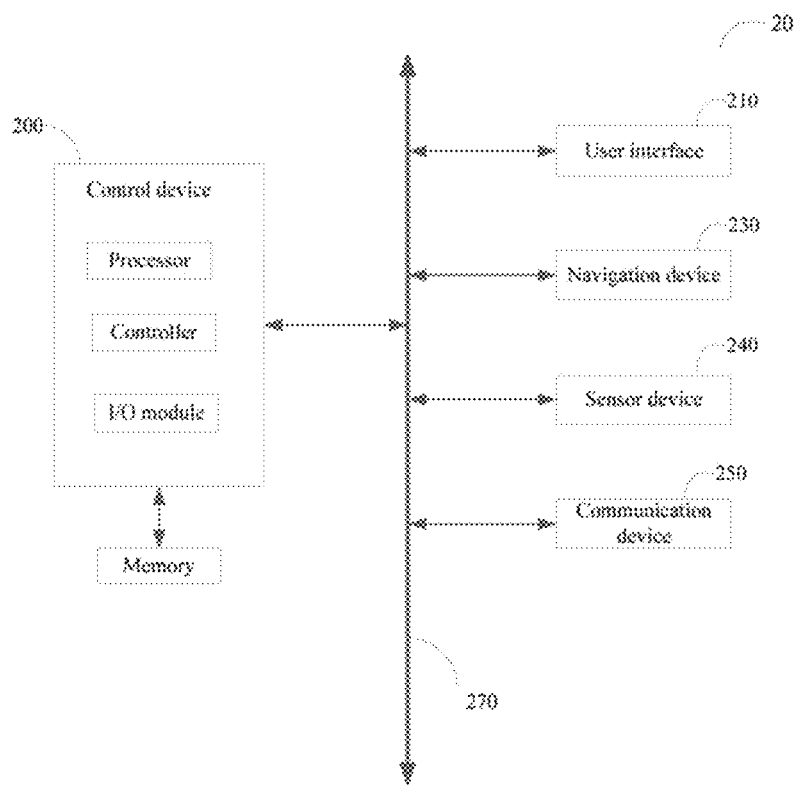
FIG. 2 is a block diagram of schematic configuration of a travel control system according to an embodiment of the present disclosure.

FIG. 2 illustrates a schematic block diagram of a vehicle travel control system 20 according to an embodiment of the present disclosure. As illustrated in FIG. 2, the vehicle travel control system 20 can comprise, for example, a control device 200, a user interface 210, a navigation device 230, a sensor device 240, a communication device 250, and so on. In an embodiment, the control device 200, the user interface 210, the navigation device 230, the sensor device 240, the communication device 250, etc. can exchange data and information over a communication bus or a communication network 270.

In an embodiment, the vehicle travel control system 20 can comprise hardware and/or software that perform various operations for the vehicle or with the vehicle. These operations can include, but not limited to, providing information to a user, receiving inputs from a user, and controlling functions or operations of the vehicle, and so on.

In an embodiment, the control device 200 can be any type of computing system operable to perform the operations as described herein. In an embodiment, the control device can communicate with the user interface 210. For example, the control device 200 can include a processor, a memory, and/or an input/output (I/O) module. Thus, the control device 200 can be a computer system, it can include hardware components that can be electrically coupled. The hardware components can include one or more central processing units (CPU); one or more components of the I/O module include one or more input devices (e.g., a mouse, a keyboard, a touch screen, etc.) and/or output devices (e.g., a display device, a printer, etc.).

The processor can include a general purpose programmable processor for executing application programming or instructions. For example, in an embodiment, the processor can include multiple processor cores, and/or be implemented as multiple virtual processors. Additionally or alternatively, the processor can include multiple physical processors. As a specific example, the processor can include a specially configured application specific integrated circuit (ASIC) or other integrated circuit, digital signal processor, hardwired electronic or logic circuit, programmable logic device or gate array, special purpose computer, or the like.

In an embodiment, the control device 200 can include an input/output module and associated ports for supporting communication over a wired or wireless network or link (e.g., with other communication device, server device, and/or peripheral device). Examples of the input/output module include Ethernet port, universal serial bus (USB) port, IEEE (Institute of Electrical and Electronics Engineers) 1594, or other interface.

In an embodiment, the control device 200 can further include one or more memories, or the control device can be externally connected to one or more memories, no limitation is made herein. For example, the memory can be a disk drive, an optical storage device, or a solid state storage device that is programmable, flash memory updateable, etc., such as a random access memory ("RAM") and/or a read only memory ("ROM").

In an embodiment, the control device 200 can also include one or more controllers that control the vehicle to travel at a set speed in response to an instruction from the processor.

In an embodiment, the processor and the controller can be integrated into one electronic control unit, for example, they can be integrated into an ECU of the vehicle.

Furthermore, the control device can further comprise a computer-readable storage medium reader/writer; the computer-readable storage medium reader/writer can read the computer-readable storage medium so as to execute computer programs stored in the computer-readable storage medium, thus implementing the method for controlling a travel speed of a vehicle according to the principles of the present disclosure. In an embodiment, the term "storage medium" can refer to one or more devices for storing data and/or instructions, including a read only memory (ROM), a random access memory (RAM), an EEPROM memory, a disk storage medium, an optical storage medium, a flash memory device, and/or other machine-readable medium for storing information.

The user interface 210 is operable to receive user inputs either through touch inputs on one or more user interface buttons, via voice commands, by one or more image sensors, or through a graphical user interface that can include a gesture capture area. The user interface 210 can receive inputs or provide information to the user. Thus, the user can interact with the vehicle travel control system 20 through the user interface 210, for providing information or data and/or for receiving inputs or data from the user.

In an embodiment, the navigation device 230 can be configured to utilize the navigation device to acquire location data so as to locate a user on road in a map database. The navigation device 230 can provide navigation information or control the vehicle using, for example, location data from a global positioning system (GPS). The navigation device 230 can include several components or modules, such as one or more of, but not limited to: a GPS antenna/receiver, a positioning module, a map database, a traffic information database, and so on.

The sensor device 240 can include a target detection sensor to detect an object existing around the host vehicle. The target detection sensor can use, for example, a surround monitoring CCD camera (a camera device) and its image recognition device; in addition, the detecting sensor can be a close-range radar such as a millimeter wave radar, an infrared radar, a laser radar, a UWB (Ultra Wide Band) radar, or the like, and an acoustic wave sensor or a sonar sensor. With the target detection sensor, a three-dimensional object can be for example detected, such as pedestrian, other vehicle, or the like around the host vehicle (including at least the vehicle traveling in front of the traveling direction of the host vehicle), a utility pole, an obstacle, a guardrail, and so on; and the target detection sensor can also detect a physical quantity of relative relationship between the host vehicle and other objects. For example, at least one of a relative position (coordinate system), a relative speed, a relative distance, and so on with respect to other objects is taken as the physical quantity.

In addition, the sensor device 240 can further include a travel parameter detecting device. For example, the travel parameter detecting device can include, but not limited to, a vehicle distance sensor, a steering torque sensor, a steering wheel angle sensor, a throttle opening sensor, a vehicle speed sensor, an acceleration sensor, an engine speed sensor, and so on. If the host vehicle is also equipped with an electric driving system, the travel parameter detecting device can further include a motor speed sensor, a motor output torque sensor, a battery output current and voltage sensor, etc.

The communication device 250 can have local area communication capability and wide area communication capability. For example, the communication device can include, but not limited to: Bluetooth® wireless system, 802.11x (e.g., wireless system such as 802.11G/802.11N/802.11AC, etc.), CAN bus, Ethernet, or other types of communication networks that can function together with or be associated with the vehicle. For example, the communication device can also include wide area communication capability, including one or more of, but not limited to: cellular communication capability, satellite telephony communication capability, wireless wide area network communication capability, or other types of communication capabilities for allowing the vehicle travel control system 20 to communicate with devices outside the vehicle. In addition, the communication device 250 can communicate with a server in a remote facility over a communication network such that the vehicle travel system can obtain further computing capability or access a cloud computing system or a cloud storage stored at a remote location.

Figure 3:
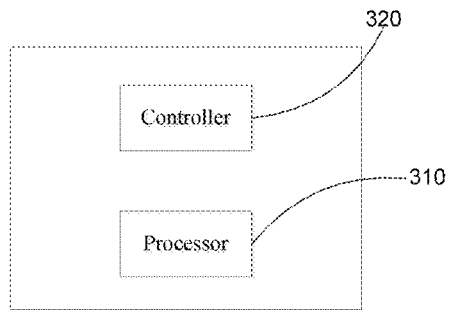
FIG. 3 is a schematic block diagram of a device for controlling a travel speed of a vehicle according to an embodiment of the present disclosure.

According to an embodiment of the present disclosure, a device for controlling a travel speed of a vehicle is provided. As illustrated in FIG. 3, the device comprises a processor 310 and a controller 320, wherein the processor is configured to set a speed curve of the host vehicle based on relative speed and distance of the host vehicle with respect to a front subject, and the controller is configured to control the host vehicle to travel according to a set speed curve. In the present disclosure, the front subject refers to a vehicle, a pedestrian or an obstacle in front of the host vehicle, it can be mobile or stationary, and no limitation is made herein. Hereinafter, for the sake of convenience, the preceding vehicle is described as the front subject, however, it should be understood that the principles of the present disclosure are not limited to the scenario of only the host vehicle and the preceding vehicle. According to an embodiment, the device illustrated in FIG. 3 can be used as a variant of the control device illustrated in FIG. 2, without the I/O module being included; the I/O module is externally connected as needed.

In an embodiment, the processor 310 is configured to establish an optimization function based on the relative speed and distance of the vehicle with respect to the front subject, and determine whether the optimization function has an optimal solution; the controller 320 is configured to control, when the optimization function has an optimal solution, the vehicle to travel according to a speed curve corresponding to the optimal solution and to control, when the optimization function does not have an optimal solution, the vehicle to travel at a first speed curve. In an embodiment, when controlling the vehicle to travel at a first speed curve, the controller can also control the output device to issue an alarm, such as controlling the speaker to emit an audible alarm or controlling the on-board display to display an alarm image. In an embodiment, the first speed curve can correspond to a deceleration curve at a maximum braking force of the vehicle.

In an embodiment, data communication (exchange) is performed between the processor 310 and the controller 320 via a CAN (Controller Area Network) bus.

In an embodiment, the processor 310 and the controller 320 can be integrated into one electronic control unit, for example, they can be integrated into an ECU of the vehicle.

According to an embodiment of the present disclosure, the function to be optimized can be established based on the relative speed and distance of the host vehicle with respect to the preceding vehicle. In an embodiment, a function in a Lagrangian-Meyer form illustrated below can be employed:

$$J = J_T + \int_0^T J_t dt \tag{1}$$

The optimization function of the above form is divided into two parts, the first part at the right end of the equation is called a terminal type or a Meyer type, mainly reflecting a terminal state of the system, and the second part at the right end of the equation is called a Lagrangian type or an integral type, mainly reflecting dynamic indicators of the system.

In an embodiment, according to the principles of the present disclosure, the following function forms can be listed for the terminal type and the integral type, respectively:

$$J_T = K_1(X_{vT} - 0)^2 + K_2\left(\frac{1}{X_{pT}} - 0\right)^2 \tag{2}$$

$$\int_{t=0}^{t_f} J_t dt = (X_v - 0)^2 + \beta\left(\int_{t=0}^{t_f} Xv dt - R_1\right)$$

In the above function (2), $J_T$ represents a relationship of the relative speed and distance between the host vehicle and the preceding vehicle in a final state, wherein $K_1$ and $K_2$ are proportional coefficients, $X_{vT}$ is a desired final relative speed between the host vehicle and the preceding vehicle, and $X_{pT}$ is a desired final distance between the host vehicle and the preceding vehicle.

In an embodiment, as a terminal type function, in order to avoid rear-end crash between the host vehicle and the preceding vehicle, $X_{vT}$ is probably desired to approach 0 in the final state, that is, the relative speed between the host vehicle and the preceding vehicle is 0, and the larger the distance between the host vehicle and the preceding vehicle is, the better it is; in mathematics, this can be expressed as $X_{pt}$ approaches infinity, that is, the reciprocal of $X_{pt}$ approaches 0.

In an embodiment, as an integral type function, in order to avoid rear-end crash between the host vehicle and the preceding vehicle in the whole process from the start of deceleration to the final state, the relative speed $X_v$ between the host vehicle and the preceding vehicle is probably desired to approach 0 at each moment, that is, the relative speed between the host vehicle and the preceding vehicle is 0, and the distance between the host vehicle and the preceding vehicle is maintained at a safety distance $R_1$, that is, the integral of $X_v$ with time approaches the safety distance $R_1$ (setting of $R_1$ will be described in detail below), wherein the coefficient β is used to quantify a degree of approximation.

Taking a case where the host vehicle decelerates to avoid rear-end crash with the preceding vehicle as an example, in consideration of that during deceleration of the host vehicle, as described above, if the deceleration is too high, a large braking force is required to cause the host vehicle to decelerate as quickly as possible. However, this manner can result in increased energy consumption of the vehicle and severe wearing of the brake system, and excessive deceleration can cause the occupant on the vehicle to feel uncomfortable. Therefore, according to the principles of the present disclosure, when optimizing the above function, a reasonable deceleration is considered to set so as to avoid large energy consumption, severe wearing, and uncomfortable feeling of the occupant when a maximum braking force is employed.

Figure 4:
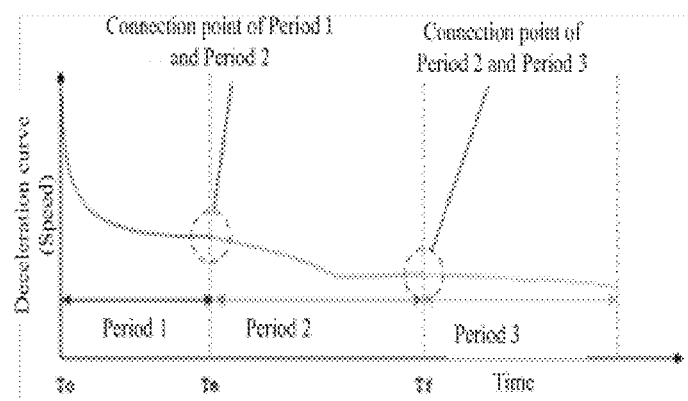
FIG. 4 illustrates a schematic diagram of a set speed curve according to an embodiment of the present disclosure.

According to an embodiment, the deceleration curve of the host vehicle is set in the form of a segmented smooth curve. For example, as illustrated in FIG. 4, a piecewise smooth curve is employed as the set speed curve. Herein, a period from $T_0$ to $T_f$ represents the deceleration time required by the host vehicle when the distance between the host vehicle and the preceding vehicle is detected to be less than the safety threshold, that is, at the time $T_f$, the relative speed between the host vehicle and the preceding vehicle is close to zero, wherein $T_f=K_m*(T_1+T_2)$, $T_1$ represents human reaction time, even in case of an unmanned vehicle driving, human being can intervene; of course, if there is no intervention in the whole process, $T_1$ is reaction time of the unmanned vehicle system, this time will be less than the human reaction time, and can be ignored; for safety reasons, it can be set as the human reaction time; $T_2$ is the shortest time when the speed of the host vehicle is decreased from the current speed to 0, $K_m$ is a safety factor, generally set to be greater than 1.

As described above, if consideration is given to, for example, comfort of the occupant, that is, considering the occupant's adaptive capacity, too rapid deceleration of the vehicle is undesired (e.g., in the case of rapid deceleration, some people can experience discomfort such as motion sickness, and in addition, rapid deceleration causes severe wearing on the braking system of the vehicle, and energy consumption of the vehicle is also large). Therefore, a speed $V_m$ can be set for example at the time $T_m$ during the set period $T_f$, and $V_m$ is a speed which the deceleration curve of the host vehicle will pass according to the optimization algorithm, and it is deemed as suitable that the speed of the vehicle is reduced to $V_m$ from $T_0$ to $T_m$, that is, the occupant feels relatively comfortable, the braking force used is appropriate, and the loss of the vehicle braking system is not large.

After $V_m$ is set, boundary conditions of the optimization function can be set, for example, during the period from $T_0$ to $T_m$ illustrated in FIG. 4:

$$To \leq t_0^{(1)} \leq Tm$$

$$X_1^0 \leq X_1^t \leq X_1^{Tm} \quad (3)$$

during the period from $T_m$ to $T_f$:

$$Tm \leq t_0^{(2)} \leq Tf$$

$$X_2^{Tm} \leq X_2^t \leq X_2^{Tf} \quad (4)$$

where $X_1$ and $X_2$ represent state vectors of the optimization function, for example, including the relative speed $X_v$ and the distance $X_p$ between the host vehicle and the preceding vehicle.

When delay of the vehicle system and the human reaction time (in the case of automatic driving, manual operation is not excluded) is taken into account, the following safety constraint equation is introduced:

$$K_{safe}\left(V_0 T_0 + \int_{t_0}^{t_f} v dt\right) \leq S_1 \quad (5)$$

where $V_0$ represents the relative speed between the host vehicle and the preceding vehicle when the distance between the host vehicle and the preceding vehicle is detected to be less than the set safety threshold, and $T_0$ represents the human reaction time (or the system delay), and v represents that the relative speed between the host vehicle and the preceding vehicle during deceleration, $S_1$ is a safety distance set for the vehicle driving system, $K_{safe}$ represents a safety coefficient, generally $K_{safe}>1$.

Thus, $$\int_{t_0}^{t_f} v dt \leq \frac{S_1}{K_{safe}} - V_0 T_0 \quad (6)$$

Let $$R_1 = \frac{S_1}{K_{safe}} - V_0 T_0, \quad (7)$$

$R_1$ represents a safety factor.

Substituting $R_1$ into the above optimization function (2) and taking into account the terminal conditions of the optimization function:

$X_{vT}=0$, that is, the relative speed between the host vehicle and the preceding vehicle is zero, and $X_{pT}$ is as large as possible, that is, the distance between the host vehicle and the preceding vehicle is as large as possible, the above optimization function (2) can be solved.

In an embodiment, other parameters of the host vehicle, such as allowed deceleration, speed change range, and the like, can be used as constraint conditions of the optimization function during the solving process.

By means of solving the above optimization function, it is determined whether the above optimization function has an optimal solution. If it is determined by means of solving that there is an optimal solution for the above optimization function, it means that the relative speed between the host vehicle and the preceding vehicle can be reduced to 0 during the period from $T_0$ to $T_f$ so that the host vehicle can be controlled to decelerate according to the set deceleration curve passing through the set speed $V_m$ while safety is satisfied, which improves occupant comfort, reduces energy consumption, and reduces wearing of the vehicle braking system.

On the contrary, if it is determined by means of solving that there is no optimal solution in the above optimization function, it means that during the period from $T_0$ to $T_f$, controlling the vehicle to decelerate according to the set deceleration curve passing through the set speed $V_m$ will not guarantee safety, that is, it cannot be ensured that the relative speed between the host vehicle and the preceding vehicle is reduced to 0 during the period from $T_0$ to $T_f$; in this case, other methods can be used to decelerate, for example, by setting a maximum deceleration to automatically decelerate, or decelerating by human intervention to ensure that there is no rear-end collision between the host vehicle and the preceding vehicle.

In the above situation, the optimal deceleration curve of the vehicle can be obtained by solving the optimization function for an optimal solution, so that the host vehicle can follow the set optimal deceleration curve to decelerate when the distance between the host vehicle and the preceding vehicle is less than the safety threshold, which not only can avoid rear-end collision with the preceding vehicle, but also can reduce braking consumption of the vehicle, lower wearing of the braking system, and make the occupant will not feel uncomfortable during the deceleration.

As an example, an algorithm for solving the above optimization function, that is, an algorithm for solving an optimization problem, is described below. For example, an optimization function can be established:

$$J = K_1(X_{vT} - 0)^2 + K_2\left(\frac{1}{X_{pT}} - 0\right)^2 + (X_v - 0)^2 + \beta\left(\int_{t=0}^{t_f} Xvdt - R_1\right) \quad (8)$$

where J represents a function of a state variant X, $$X = \begin{bmatrix} X_p \\ X_v \end{bmatrix}$$

$X_p$ represents the distance between the host vehicle and the preceding vehicle, and $X_v$ represents the relative speed between the host vehicle and the preceding vehicle.

For the above-mentioned nonlinear optimization problem, many algorithms can be employed, and as known to those skilled in the art, a gradient descent method, a conjugate gradient method, a variable scale method, a step acceleration method, or the like can be employed. According to an embodiment of the present disclosure, a Newton iteration method will be employed to solve the above optimization problem. The Newton iteration method is described in detail below.

For example, for the problem of $f(x)=0$, a first-order Taylor expansion is used:

$$f(x)=f(x_0)+f'(x_0)*(x-x_0)+O((x-x_0)^2), \quad (9)$$

Ignoring the latter high-order expansion item, substituting $x=x_0+\Delta x$, it yields:

$$f(x)=f(x_0+\Delta x)=f(x_0)+f'(x_0)*\Delta x; \quad (10)$$

If the problem of $f'(x)=0$ is to be solved, a second-order Taylor expansion is needed:

$$f(x)=f(x_0)+f'(x_0)*(x-x_0)+0.5*f''(x_0)*(x-x_0)^2+O((x-x_0)^3), \quad (11)$$

Ignoring the latter high-order expansion item, substituting $x=x_0+\Delta x$, it yields:

$$f(x)=f(x_0+\Delta x)=f(x_0)+f'(x_0)*\Delta x+0.5*f''(x_0)*\Delta x^2; \quad (12)$$

Derivative calculation is performed, $f'(x)=f'(x_0+\Delta x)=0$, it yields:

$$[f(x_0)+f'(x_0)*(x-x_0)+0.5*f''(x_0)*((x-x_0)^2)]'=0 \quad (13)$$

Thus, $f'(x_0)+f''(x_0)(x-x_0)=0$ $$x=x_0-f'(x_0)/f''(x_0) \rightarrow x_{n+1}=x_n-f'(x_n)/f''(x_n), n=0,1,2,\ldots \quad (14)$$

The above derivation for the Newton iteration method is for the monovariant problem, that is, the one-dimensional problem, and for the multi-dimensional problem, such as the n-dimensional problem (n>1), a quadratic curve for approximation of the target function f(x) at the point $X^k$ can be obtained as:

$$\varphi(X^k)=f(X^k)+[\nabla f(X^k)][X-X^k]+\frac{1}{2}[X-X^k]\cdot\nabla^2 f(X^k)\cdot[X-X^k]^2 \quad (15)$$

where $\nabla^2 f(X^k)$ represents a Hessian matrix, let Hessian $\nabla^2 f(X^k)=H(X^k)$, the above equation can be represented as:

$$\varphi(X^k)=f(X^k)+[\nabla f(X^k)][X-X^k]+\frac{1}{2}[X-X^k]\cdot H(X^k)\cdot[X-X^k]^2 \quad (16)$$

When $\nabla\varphi(X)=0$, an extreme point of $\varphi(X)$ can be obtained.

To solve the above function formula (8) for an optimal solution, it is possible to let the objective function f(x)=J, and as described above, iterations for the Newton method can be applied thereto to determine whether the above function formula (8) has an optimal solution. If there is an extreme point, it means that the function formula (8) has a solution, and a curve of the state variable Xv is outputted correspondingly; on the contrary, if it is determined that the above function formula (8) does not have an extreme point, it can be determined that there is no optimal solution, in this case, for example, a maximum deceleration can be used for braking to ensure safety.

In the above algorithm for setting the deceleration curve of the host vehicle according to an embodiment of the present disclosure, it is considered that the optimal solution of the optimization function is determined to correspond to a case where the distance between the host vehicle and the preceding vehicle is as large as possible, and the relative speed between the host vehicle and the preceding vehicle is as small as possible, that is, it is ensured that the safety threshold corresponding to the optimal solution is as large as possible.

In fact, the principles of the present disclosure can also be applied to the situation of vehicle following. In the context of vehicle following, the corresponding optimal solution of the optimization function makes the distance between the host vehicle and the preceding vehicle be as small as possible, and the relative speed between the host vehicle and the preceding vehicle be as small as possible, that is, it is ensured that the distance between vehicles corresponding to the optimal solution is as small as possible, thereby roadway utilization is improved while driving safety is ensured. In this case, a Lagrange-Meyer form can be used to rewrite the optimization function as:

$$J_T = K_1(X_{vT} - 0)^2 + K_2(X_{pT} - 0)^2 \quad (17)$$

$$\int_{t=0}^{t_f} J_t dt = (X_v - 0)^2 + \beta\left(\int_{t=0}^{t_f} Xvdt - R_2\right)$$

In the above function (17), $J_T$ represents a relationship of the relative speed and distance between the host vehicle and the preceding vehicle in a final state, wherein $K_1$ and $K_2$ are proportional coefficients, $X_{vT}$ is a desired final relative speed between the host vehicle and the preceding vehicle, and $X_{pT}$ is a desired final distance between the host vehicle and the preceding vehicle.

In an embodiment, as a terminal type function $J_T$, in order to make the host vehicle closely follow the preceding vehicle, the distance between the host vehicle and the preceding vehicle is probably desired to approach 0 in the final state; in mathematics, this can be expressed as $X_{pT}$ approaching 0; and to ensure the security, that is, to avoid the rear-end collision between the host vehicle and the preceding vehicle, the relative speed between the host vehicle and the preceding vehicle is desired to approach 0 in the final state, that is $X_{vT}$ approaches 0.

In an embodiment, as an integral type function $$\int_{t=0}^{t_f} J_t dt,$$

in order to avoid rear-end crash between the host vehicle and the preceding vehicle in the whole process, the relative speed $X_v$ between the host vehicle and the preceding vehicle is probably desired to approach 0 at each moment, that is, the relative speed between the host vehicle and the preceding vehicle is 0, and the distance between the host vehicle and the preceding vehicle is maintained at a following distance $R_2$, that is, the integral of $X_v$ with time approaches the following distance $R_2$ (setting of $R_2$ will be described in detail below), wherein the coefficient $\beta$ is used to quantify a degree of approximation.

In the above situation, by means of solving the optimization function for an optimal solution, the host vehicle can closely follow the preceding vehicle during the driving process, so that the distance between vehicles is relatively small, thereby improving roadway utilization, and reducing traffic congestion.

Specifically, similar to the setting of the above-described deceleration curve, according to the principles of the present disclosure, when delay of the vehicle system and the human reaction time (in the case of automatic driving, manual operation is not excluded) are taken into account, the following constraint equation is introduced:

$$K_{flw}\left(V_0 T_0 + \int_{t_0}^{t_f} v dt\right) \le S_2 \quad (18)$$

where $V_0$ represents the relative speed between the host vehicle and the preceding vehicle when the distance between the host vehicle and the preceding vehicle is detected to be higher than a set following threshold, $T_0$ represents the human reaction time (or the system delay), and v represents that the relative speed between the host vehicle and the preceding vehicle during traveling, $S_2$ is a following distance set for the vehicle driving system, $K_{flw}$ represents a following coefficient, generally $K_{flw} > 1$.

Thus, $$\int_{t_0}^{t_f} v dt \le \frac{S_2}{K_{flw}} - V_0 T_0 \quad (19)$$

Let $$R_2 = \frac{S_2}{K_{safe}} - V_0 T_0, \quad (20)$$

$R_2$ represents a following factor.

Substituting $R_2$ into the above optimization function (17) and taking into account the terminal conditions of the optimization function:

$X_{vT}=0$, that is, the relative speed between the host vehicle and the preceding vehicle is zero, $X_{pT}=0$, that is, the distance between the host vehicle and the preceding vehicle is as small as possible, the above optimization function (17) can be solved.

In an embodiment, other parameters of the host vehicle, such as allowed deceleration, speed change range, and the like, can be used as constraint conditions of the optimization function during the solving process.

By means of solving the above optimization function, it is determined whether the optimization function has an optimal solution. If it is determined by means of solving that there is an optimal solution for the above optimization function, it means that the relative speed between the host vehicle and the preceding vehicle can be reduced to 0 during the period from $T_0$ to $T_f$, and the distance between the host vehicle and the preceding vehicle can be reduced to the following distance; in this way, it is possible to control the vehicle to travel according to the set speed curve while safety is satisfied, thereby reducing distance between vehicles and improving roadway utilization.

On the contrary, if it is determined by means of solving that the optimization function does not have an optimal solution, it means that during the period from $T_0$ to $T_f$, it is impossible to control the host vehicle to travel according to the set speed curve to thereby follow the preceding vehicle with the set following distance. In this case, the set following distance can be appropriately extended to ensure that the vehicle does not have a rear-end collision with the preceding vehicle. For example, the vehicle is controlled to travel at a second speed, and the second speed is less than the speed of the preceding vehicle.

For solving of the optimization function (17), as an example, the Newton iteration method can also be employed. For example, an optimization function can be established:

$$J = K_1(X_{vT}-0)^2 + K_2(X_{pT}-0)^2 + (X_v-0)^2 + \beta\left(\int_{t=0}^{t_f} X_v dt - R\right) \quad (21)$$

where J represents a function on a state variant, $$X = \begin{bmatrix} X_p \\ X_v \end{bmatrix}$$

$X_p$ represents the distance between the host vehicle and the preceding vehicle, and $X_v$ represents the relative speed between the host vehicle and the preceding vehicle.

For the specific process, reference can be made to the above description, and details are not repeated herein again.

In fact, as described above, there are many algorithms that can be employed for the above-mentioned nonlinear optimization problem, and as known to those skilled in the art, a gradient descent method, a conjugate gradient method, a variable scale method, a step acceleration method, or the like can be employed to solve the optimization function, therefore, the principles of the present disclosure are not limited to the use of the Newton iteration method to solve the above optimization problem.

The algorithm for setting the speed curve employed by the embodiment of the present disclosure has been described above, and the vehicle travel control device of the present disclosure will be described below in conjunction with the embodiments.

According to an embodiment of the present disclosure, the device for controlling travel of a vehicle further comprises:

a vehicle distance sensor that detects a distance between the host vehicle and the front subject (e.g., the vehicle, pedestrian, obstacle etc. in front). For example, a millimeter wave radar sensor, a laser range finder, a sonar sensor, or an ultrasonic sensor can be installed at the front of the host vehicle to measure the distance from the preceding vehicle.

In an embodiment, the control device further comprises:

a relative speed detector/estimator that detects or estimates the relative speed between the host vehicle and the preceding vehicle.

In an embodiment, obtaining of the relative vehicle speed can also adopt an indirect manner, for example, acquiring the speed of the preceding vehicle in real time via vehicle-to-vehicle communication, so that the relative vehicle speed between the host vehicle and the preceding vehicle can be calculated.

In an embodiment, the control device further comprises:

an acceleration sensor that detects acceleration/deceleration of the host vehicle and provides the detected acceleration/deceleration as an input signal to the processor.

In the case where the vehicle is a conventional fuel vehicle, the control device can further comprise, but not limited to: a throttle opening sensor that detects an opening of a throttle valve provided in an intake port of the engine; an engine rotational speed sensor that detects a rotational speed of the engine; and a vehicle speed sensor that detects a rotational speed of an output shaft of a gearbox, whose rotational speed is proportional to the vehicle speed.

In the case where the vehicle is a hybrid vehicle or an all-electric vehicle including an electric driving system, the control device can also comprise, but not limited to, a motor rotational speed sensor, a motor torque sensor, and the like.

In an embodiment, the processor receives the detection signals acquired by the respective sensors, for example, receiving the signal representing the distance between the host vehicle and the preceding vehicle acquired by the vehicle distance sensor, the signal representing the relative vehicle speed between the host vehicle and the preceding vehicle detected by the relative speed detector, an optimization function about speed is established according to the relative speed and distance between the host vehicle and the front subject, and thus the optimization function is solved such that the relative speed between the vehicle and the front subject is close to zero when traveling according to the set speed curve.

In an embodiment, the processor is configured to: when solving the optimization function, make the distance between the vehicle and the front subject be kept as large as possible when the vehicle travels at the set speed curve. In this case, the safety distance between the host vehicle and the front subject can be ensured to the greatest extent, the braking force during deceleration can be reduced, thereby lowering the braking energy consumption and the wearing of the braking system.

In an embodiment, the processor is configured to: when solving the optimization function, make the distance between the vehicle and the front subject be kept as small as possible when the vehicle travels at the set speed curve. In this case, the following performance of the host vehicle and the preceding vehicle can be ensured to the greatest extent, thus reducing the distance between the vehicles and improving the roadway utilization.

In an embodiment, according to an embodiment of the present disclosure, the control device can further comprise an alarm device, wherein the alarm device issues an alarm when the vehicle distance sensor detects that the distance between the host vehicle and the front subject is less than a safety threshold. For example, an audible alarm or an image alarm can be issued as needed.

In an embodiment, the control device is configured to acquire relevant parameters of the vehicle at the time of alarming, for example, the relative speed detector/estimator detects or estimates the relative speed between the host vehicle and the preceding vehicle when the alarming occurs, and the vehicle distance sensor detects the distance between the host vehicle and the preceding vehicle when the alarming occurs, the acceleration sensor detects the acceleration/deceleration of the vehicle at this time, and the processor is configured to determine the safety constraint equation according to the relevant parameters of the vehicle as acquired at the time of alarming.

In an embodiment, in the control device of the present disclosure, the processor is configured to determine whether the optimization function has an optimal solution when solving the optimization function, and if there is an optimal solution, to output an optimized curve about speed as the set speed curve; otherwise, the processor is configured to instruct the controller to output an alarm signal and controls the vehicle to decelerate at a first deceleration.

In an embodiment, the first deceleration corresponds to a maximum braking force of the vehicle.

In an embodiment, in the control device of the present disclosure, the speed curve is a segmented curve, and the processor is configured to determine boundary conditions such that each segmentation curve is continuous at the boundaries.

In an embodiment, the control device can be applied to an unmanned vehicle or an autonomous vehicle so that the vehicle can be controlled to travel according to the set optimal speed. For example, after the optimal driving speed is set, the control device can output a command to a servo motor to control the throttle opening, and adaptively adjust the engine throttle opening in real time according to the change of travelling resistance, so that the traveling speed follows the set optimal speed curve. If the host vehicle includes an electric driving system, the control device can output an instruction to the electric driving system to adaptively adjust the output torque of the driving motor to cause the vehicle speed to follow the set optimal speed curve.

In an embodiment, according to an embodiment of the present disclosure, adaptive cruise control of the vehicle can be implemented, for example, traffic conditions in front of the vehicle are detected by using a radar system installed in front of the vehicle while the vehicle is travelling, so as to maintain a safety distance. When other vehicle enters the lane and accordingly the safety distance is insufficient, the vehicle automatically decelerates, and when there is a sufficient safety distance between the preceding vehicle, the host vehicle automatically accelerates to return to the set following distance or the speed set by the driver.

Figure 5:
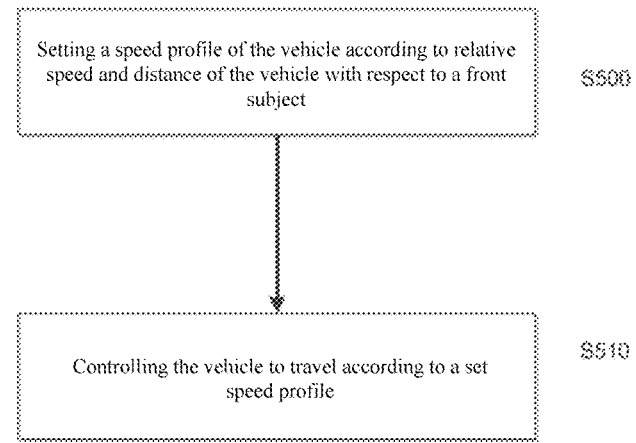
FIG. 5 is a flowchart of a method for controlling a travel speed of a vehicle according to an embodiment of the present disclosure.

According to another embodiment of the present disclosure, there is provided a method for controlling a travel speed of a vehicle. As illustrated in FIG. 5, said method comprises: S500, setting a speed curve of the vehicle according to relative speed and distance of the vehicle with respect to a front subject; S510, controlling the vehicle to travel according to the set speed curve; wherein an optimization function about speed is established based on the relative speed and distance of the vehicle with respect to the front subject, and the optimization function is solved, such that the relative speed of the vehicle with respect to the front subject is close to zero when the vehicle travels at a speed corresponding to a solution obtained by solving the optimization function.

In an embodiment, the method further comprises: when solving the optimization function, making the distance between the vehicle and the front subject as large as possible when the vehicle travels at the set speed curve. In this case, the safety distance between the host vehicle and the front subject can be ensured to the greatest extent, the braking force during deceleration can be reduced, thereby lowering the braking energy consumption and the wearing of the braking system.

In an embodiment, the method further comprises: when solving the optimization function, making the distance between the vehicle and the front subject as small as possible when the vehicle travels at the set speed curve. In this case, the following performance of the host vehicle and the preceding vehicle can be ensured to the greatest extent, thus reducing the distance between the vehicles and improving the roadway utilization.

In an embodiment, the method further comprises: detecting the relative speed and distance of the vehicle with respect to the front subject.

In an embodiment, the method further comprises: when the distance is less than a threshold, outputting an alarm signal; and obtaining relevant parameters of the vehicle at the time of alarming.

In an embodiment, the method further comprises: determining a constraint equation based on relevant parameters of the vehicle at the time of alarming, wherein the relevant parameters of the vehicle include at least one of the relative speed of the vehicle with respect to the front subject, human reaction time, and the safety threshold.

In an embodiment, the method further comprises: determining whether the optimization function has an optimal solution when solving the optimization function, and if there is an optimal solution, outputting an optimized curve about speed as the set speed curve; otherwise, outputting an alarm signal and controlling the vehicle to decelerate at a first deceleration.

In an embodiment, the first deceleration corresponds to a maximum braking force of the vehicle.

In an embodiment, the speed curve is a segmented curve, and the processor is configured to determine boundary conditions such that each segmentation curve is continuous at the boundaries.

Figure 6:
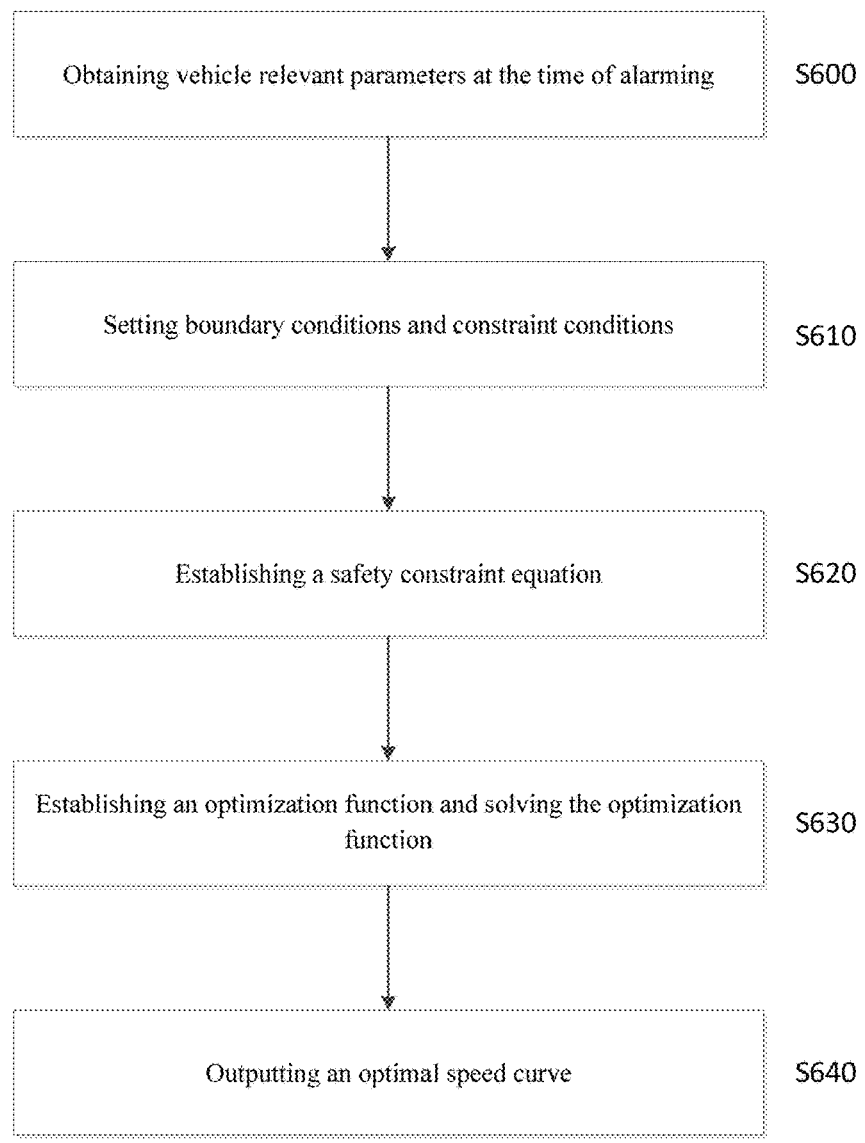
FIG. 6 is a flowchart of setting a travel speed of a vehicle according to an embodiment of the present disclosure.

FIG. 6 schematically illustrates a method of setting an optimal speed curve according to an embodiment of the present disclosure. As illustrated in FIG. 6, the method comprises: S600, obtaining relevant parameters of the vehicle at the time of alarming; wherein, for example, a distance from the preceding vehicle is detected by the vehicle distance detector, and if the detected vehicle distance is less than or equal to a preset safety distance, an audible alarm will be sounded through the speaker or an image alarm will be displayed through the on-board display, and relevant parameters of the vehicle at the time of alarming, such as speed, acceleration, relative speed with respect to the preceding vehicle, distance to the preceding vehicle, throttle opening, engine speed, engine gear position, will be obtained; if the host vehicle includes an electric driving system, parameters such as output torque of the driving motor and rotational speed of the driving motor can also be obtained; S610, setting boundary conditions, constraint conditions, and intermediate states, for example, as described above, setting the number of speed segmented curves, the boundary continuous conditions of the segmented curves at a connection point, and taking a certain speed point through which the deceleration curve will pass as an intermediate state; S620, establishing a safety constraint equation, for example, when it is detected that the distance between the host vehicle and the preceding vehicle is lower than the set safety threshold, establishing a safety constraint equation according to the relative speed between the host vehicle and the preceding vehicle, the human respond time (or the system delay), the relative speed between the host vehicle and the preceding vehicle during the deceleration, and the safety distance set by the vehicle travel system, such as the safety constraint illustrated in Equations (5) or (18) in the above; S630, establishing an optimization function, for example, establishing a state equation with the relative speed between the host vehicle and the preceding vehicle and the distance between the host vehicle and the preceding vehicle as state variables, for example, a state equation in the form of Lagrange-Meyer, and solving the equation to determine whether the state equation has an optimal solution, wherein the specific solution algorithm can be, for example, a Newton iterative method, a gradient descent method, a conjugate method, etc., and those skilled in the art can make a selection according to actual needs, as long as the optimization function is established; when the optimization function is solved, if there is an optimal solution, outputting the optimal speed curve as illustrated in S640; otherwise, if there is no optimal solution, the vehicle can be controlled to travel at a certain speed, for example, to decelerate at a maximum braking force corresponding to the maximum deceleration so as to ensure the safety as much as possible.

Figure 7:
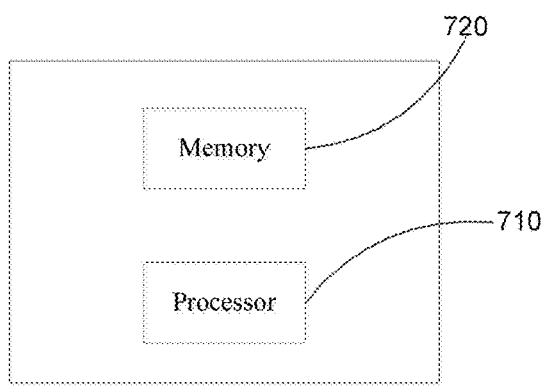
FIG. 7 is a schematic block diagram of another device for controlling a travel speed of a vehicle according to an embodiment of the present disclosure.

According to another aspect of the present disclosure, there is also provided a control device for a controlling travel speed of a vehicle, as illustrated in FIG. 7, said device comprises a processor 710 and a memory 720, wherein the memory 720 stores program instructions, and the processor 710 is configured to execute the program instructions stored in the memory 720 to cause the following method to be performed: setting a speed curve of the vehicle based on the relative speed and distance between the vehicle and the front subject; controlling the vehicle to travel according to a set speed curve; wherein for example, an optimization function is established according to the relative speed and distance between the vehicle and the front subject, and the optimization function is solved such that the relative speed between the vehicle and the front subject is close to zero when the vehicle is traveling according to the set speed curve.

According to another aspect of the present disclosure, there is also provided a computer-readable storage medium having stored thereon program instructions that, when executed by a computer, cause the following method to be implemented: setting a speed curve of the vehicle based on the relative speed and distance between the vehicle and the front subject; controlling the vehicle to travel according to a set speed curve; wherein for example, an optimization function is established according to the relative speed and distance between the vehicle and the front subject, and the optimization function is solved such that the relative speed between the vehicle and the front subject is close to zero when the vehicle is traveling according to the set speed curve.

According to the control device and method provided by the present disclosure, the vehicle can be controlled to travel at a set optimal speed, which ensures a safe distance between the host vehicle and the preceding vehicle, pedestrian etc., reduces energy consumption at the time of deceleration braking and wearing of the vehicle braking system, and improves the occupant's comfort; in addition, it can reduce the distance between the host vehicle and the preceding vehicle, which improves roadway utilization and reduces traffic congestion while ensuring safety.

The above description is only exemplary embodiments of the present disclosure, and is not intended to limit the scope of the present disclosure. The scope of the disclosure is determined by the appended claims.

What is claimed is:

1. A device for controlling travel of a vehicle, comprising:
    a processor configured to set a speed curve of the vehicle based on a relative speed and distance of the vehicle with respect to a front subject; and
    a controller configured to control the vehicle to travel according to the set speed curve,
    wherein the processor is further configured to:
    establish a nonlinear optimization function about speed based on the relative speed and distance of the vehicle with respect to the front subject; and
    solve the optimization function, such that the relative speed of the vehicle with respect to the front subject is close to zero when the vehicle travels at a speed corresponding to a solution obtained by solving the optimization function,
    wherein the speed curve is a piecewise smooth curve, and is set to pass through a predetermined speed at a predetermined time during deceleration,
    the processor is further configured to:
    set the speed curve by using the optimization function, and determine boundary conditions of the optimization function such that each segmentation curve of the piecewise smooth curve is continuous at the boundaries; and
    judge whether the optimization function has a solution when solving the optimization function, and if there is a solution, output an optimized curve about speed as the set speed curve; otherwise, instruct the controller to control the vehicle to travel at a first travel speed curve.

2. The device according to claim 1, wherein the distance between the vehicle and the front subject approaches infinity when the controller controls the vehicle to travel at the set speed curve.

3. The device according to claim 1, wherein the distance between the vehicle and the front subject approaches 0 when the controller controls the vehicle to travel at the set speed curve.

4. The device according to claim 1, further comprising:
    at least one sensor configured to detect the relative speed and distance of the vehicle with respect to the front subject.

5. The device according to claim 4, wherein
    the processor is configured to determine a constraint equation based on relevant parameters of the vehicle when establishing the optimization function about speed, wherein the constraint equation ensures that the distance between the vehicle and the front subject is kept at a safety threshold.

6. The device according to claim 5, wherein the relevant parameters of the vehicle include at least one of the relative speed of the vehicle with respect to the front subject, human reaction time, and the safety threshold.

7. The device according to claim 1, wherein the first travel speed curve corresponds to a speed curve of the vehicle traveling at a maximum deceleration.

8. A method for controlling travel of a vehicle, comprising:
    setting a speed curve of the vehicle according to a relative speed and distance of the vehicle with respect to a front subject; and
    controlling the vehicle to travel according to the set speed curve,
    wherein the speed curve is a piecewise smooth curve, and is set to pass through a predetermined speed at a predetermined time during deceleration,
    wherein a nonlinear optimization function about speed is established based on the relative speed and distance of the vehicle with respect to the front subject; and
    the optimization function is solved, such that the relative speed of the vehicle with respect to the front subject is close to zero when the vehicle travels at a speed corresponding to a solution obtained by solving the optimization function,
    wherein the method further comprising:
    setting the speed curve by using the optimization function, and determining boundary conditions of the optimization function such that each segmentation curve of the piecewise smooth curve is continuous at the boundaries; and
    judging whether the optimization function has a solution when solving the optimization function, and if there is a solution, outputting an optimized curve about speed as the set speed curve; otherwise, controlling the vehicle to travel at a first travel speed curve.

9. The method according to claim 8, further comprising:
    keeping the distance between the vehicle and the front subject approaching infinity when the controller controls the vehicle to travel at the set speed curve.

10. The method according to claim 8, further comprising:
    keeping the distance between the vehicle and the front subject approaching 0 when the controller controls the vehicle to travel at the set speed curve.

11. The method according to claim 8, further comprising:
    detecting the relative speed and distance of the vehicle with respect to the front subject, and determining a constraint equation based on relevant parameters of the vehicle when establishing the optimization function about speed, wherein the constraint equation ensures that the distance between the vehicle and the front subject is kept at a safety threshold.

12. The method of claim 11, wherein the relevant parameters of the vehicle include at least one of the relative speed of the vehicle with respect to the front subject, human reaction time, and the safety threshold.

13. The method of claim 8, wherein the first travel speed curve corresponds to a speed curve of the vehicle traveling at a maximum deceleration.

14. A non-transitory storage medium having stored thereon program instructions which, when executed by a processor, cause the method according to claim 8 to be implemented.

* * * * *

UNITED STATES PATENT AND TRADEMARK OFFICE
CERTIFICATE OF CORRECTION

| | |
|---|---|
| PATENT NO. | : 11,427,198 B2 |
| APPLICATION NO. | : 16/330861 |
| DATED | : August 30, 2022 |
| INVENTOR(S) | : Ying Wu et al. |

It is certified that error appears in the above-identified patent and that said Letters Patent is hereby corrected as shown below:

On the Title Page

(71) Applicant should read: BOE TECHNOLOGY GROUP CO., LTD., Beijing (CN)

Signed and Sealed this
Fourteenth Day of February, 2023

Katherine Kelly Vidal
*Director of the United States Patent and Trademark Office*